US009718713B2

(12) United States Patent
Calo et al.

(10) Patent No.: US 9,718,713 B2
(45) Date of Patent: Aug. 1, 2017

(54) ARSENIC REMOVAL SYSTEM

(71) Applicant: Brown University, Providence, RI (US)

(72) Inventors: Joseph Calo, Providence, RI (US); Madhavan Lakshmi, Providence, RI (US); Johannes Kirchner, Providence, RI (US); Euan Bain, Aberdeen (GB)

(73) Assignee: Brown University, Providence, RI (US)

( * ) Notice: Subject to any disclaimer, the term of this patent is extended or adjusted under 35 U.S.C. 154(b) by 710 days.

(21) Appl. No.: 13/768,477

(22) Filed: Feb. 15, 2013

(65) Prior Publication Data

US 2013/0228522 A1 Sep. 5, 2013

Related U.S. Application Data

(60) Provisional application No. 61/610,249, filed on Mar. 13, 2012, provisional application No. 61/600,049, filed on Feb. 17, 2012.

(51) Int. Cl.
*B01D 15/00* (2006.01)
*B01D 15/02* (2006.01)
(Continued)

(52) U.S. Cl.
CPC .............. *C02F 1/68* (2013.01); *B01D 15/206* (2013.01); *B01D 15/22* (2013.01); *B01J 20/0229* (2013.01); *C02F 1/281* (2013.01); *B01D 15/08* (2013.01); *B01D 15/1807* (2013.01); *B01D 15/1892* (2013.01); *B01D 15/26* (2013.01); *B01D 24/36* (2013.01); *C02F 1/683* (2013.01); *C02F 1/705* (2013.01); *C02F 2101/103* (2013.01); *C02F 2303/08* (2013.01)

(58) Field of Classification Search
CPC ........ B01D 24/26; B01D 24/28; B01D 24/30; B01D 24/32; B01D 24/34; B01D 24/36
USPC .................................................. 210/269–273
See application file for complete search history.

(56) References Cited

U.S. PATENT DOCUMENTS 6,193,858 B1 * 2/2001 Hradil ....................... B01J 2/16
118/303
7,635,236 B2  12/2009 Zhao et al.
(Continued)

OTHER PUBLICATIONS

Kanel et al. ("Removal of Arsenic(III) from Groundwater by Nanoscale Zero-Valent Iron", Eviron. Sci. Technol., 2005, 39, 1291-1298.*
(Continued)

*Primary Examiner* — Clare Perrin
(74) *Attorney, Agent, or Firm* — Banner & Witcoff, Ltd.

(57) ABSTRACT

A system is provided for removing arsenic from water to safe levels at or below the EPA standards. The system is a hybrid spouted vessel/fixed bed filter system that significantly enhances/improves arsenic removal for drinking water using zero-valent iron (ZVI) particles. Movement of the circulating, iron-containing particles in a dense moving bed that forms on the spouted vessel bottom creates an abrasive "self-polishing" action among them that continuously generates colloidal iron corrosion products. This material then circulates with the water in the vessel and is removed and concentrated in a fixed bed filter. The colloidal material captured and immobilized in the filter has been shown to remove arsenic from contaminated water at very rapid rates.

13 Claims, 4 Drawing Sheets

(51) Int. Cl.
| | | |
|---|---|---|
| *B01D 24/00* | (2006.01) | |
| *B01D 29/00* | (2006.01) | |
| *B01D 21/01* | (2006.01) | |
| *C02F 1/52* | (2006.01) | |
| *B03D 3/00* | (2006.01) | |
| *C02F 1/68* | (2006.01) | |
| *B01D 15/20* | (2006.01) | |
| *B01J 20/02* | (2006.01) | |
| *B01D 15/22* | (2006.01) | |
| *C02F 1/28* | (2006.01) | |
| *B01D 24/32* | (2006.01) | |
| *B01D 24/46* | (2006.01) | |
| *C02F 1/00* | (2006.01) | |
| *B01J 19/18* | (2006.01) | |
| *B01J 8/00* | (2006.01) | |
| *B01J 10/00* | (2006.01) | |
| *B01D 37/00* | (2006.01) | |
| *B01D 15/08* | (2006.01) | |
| *B01D 15/18* | (2006.01) | |
| *B01D 15/26* | (2006.01) | |
| *B01D 24/36* | (2006.01) | |
| *C02F 1/70* | (2006.01) | |
| *C02F 101/10* | (2006.01) | |

(56) References Cited

U.S. PATENT DOCUMENTS

| | | | | |
|---|---|---|---|---|
| 2004/0084379 | A1* | 5/2004 | Ballard | B01D 21/0018 210/723 |
| 2007/0163958 | A1* | 7/2007 | Newcombe | C02F 1/004 210/650 |
| 2010/0276360 | A1* | 11/2010 | Smith | C02F 1/28 210/601 |
| 2011/0120879 | A1* | 5/2011 | Buschmann | C25C 1/12 205/339 |
| 2012/0273431 | A1 | 11/2012 | Huang | |

OTHER PUBLICATIONS

Leupin et al. ("Oxidation and removal of arsenic (III) from aerated groundwater by filtration through sand and zero-valent iron", Water Research, 2005, 39, 1729-1740.*

* cited by examiner

Click here to download high resolution image

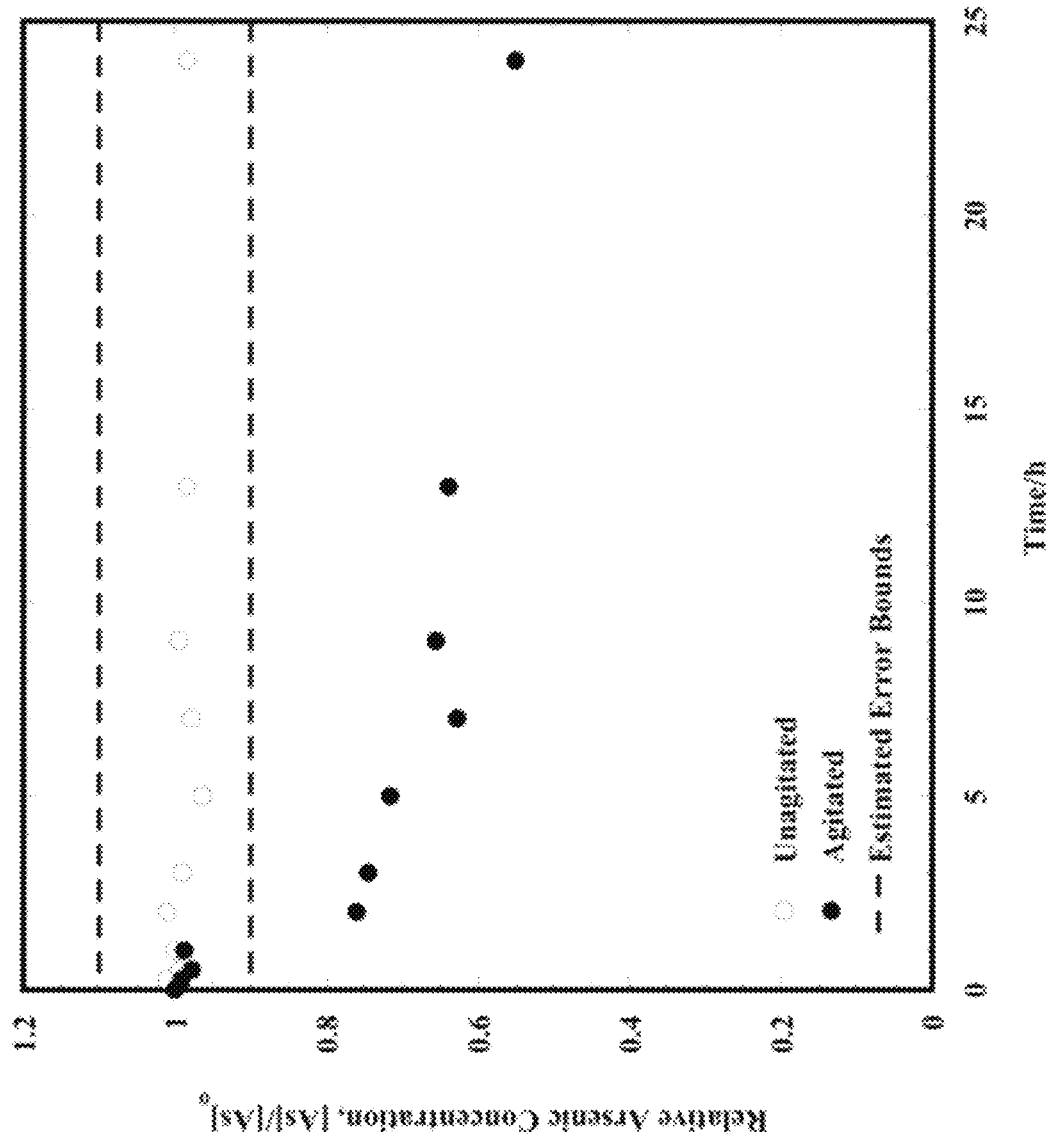

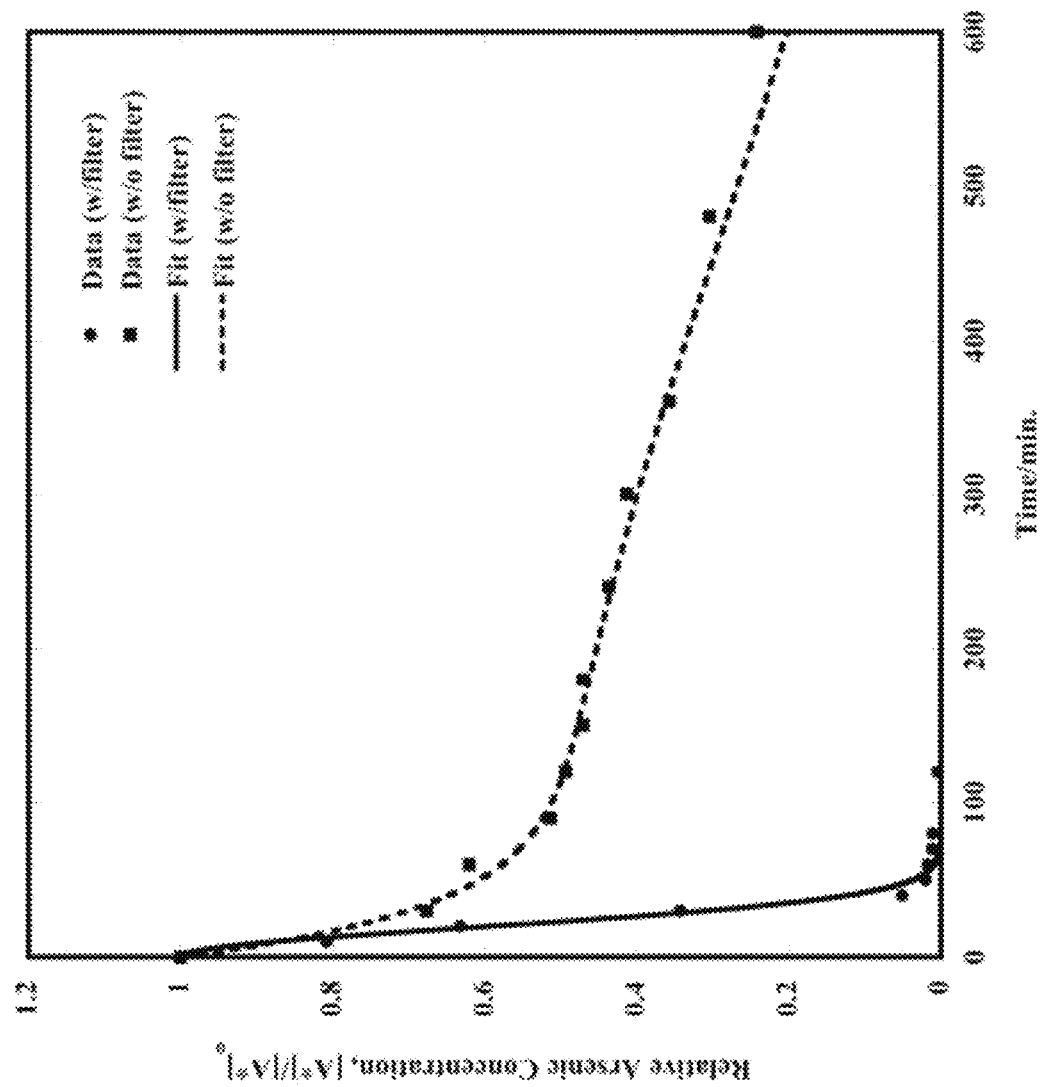

ARSENIC REMOVAL SYSTEM

CROSS-REFERENCE TO RELATED APPLICATIONS

This application is related to and claims priority from earlier filed U.S. Provisional Patent Application No. 61/610,249, filed Mar. 13, 2012 and earlier filed U.S. Provisional Application No. 61/600,049, filed Feb. 17, 2012.

STATEMENT OF GOVERNMENT INTERESTS

This invention was made with government support under 5 P42 ES013660 awarded by the National Institutes of Health. The government has certain rights in the invention.

BACKGROUND OF THE INVENTION

The present invention relates generally to filter system for rapidly removing arsenic from contaminated drinking water. More specifically, the present invention relates to a hybrid filter bed system that significantly improves arsenic removal form drinking water using zero-valent iron particles.

Arsenic is a toxic element that naturally occurs in a variety of combined forms in the earth. Its presence in natural waters may originate, for example, from geochemical reactions, industrial waste discharges and past agricultural uses of arsenic-containing pesticides. Because the presence of high levels of arsenic may have carcinogenic and other deleterious effects on living organisms, the U.S. Environmental Protection Agency (EPA) and the World Health Organization have set the maximum contaminant level (MCL) for arsenic in drinking water at 10 parts per billion (ppb). Further, there are regulatory proposals that the maximum arsenic levels be no more than 2 ppb.

Water produced by many municipal water systems, particularly in the western United States as well as other locals, typically has arsenic levels up to about 50 ppb and higher and thus is commonly higher than proposed lower levels for arsenic, and is in some instances higher than currently accepted levels for arsenic. Some purification means must be employed to remove arsenic prior to consumption of the water. The problem is compounded by the presence of minerals, including carbonates, which interfere with many purification schemes and methods. Particularly with water obtained from areas with geologic evidence of volcanic activity, both high arsenic levels and high mineral content, including carbonates, are typical.

Various technologies have been used in the past to remove arsenic from aqueous systems. Examples of such techniques include adsorption on high surface area materials, such as alumina and activated carbon, ion exchange with anion exchange resins, co-precipitation and electro-dialysis. However, most technologies for arsenic removal are hindered by the difficulty of removing the arsenite form of the contamination.

It is known that the oxidation rate at the ZVI-water interface determines the nature of the oxides and oxyhydroxides formed on the iron surface, as well as the final corrosion products. These corrosion products include lepidocrocite and magnetite with green rust and bernalite as intermediates. Studies of the geometry of co-precipitated and adsorbed arsenate on the ZVI corrosion products ferrihydrite, goethite, akageneite, and lepidocrocite, concluded that arsenate ligands primarily form an inner sphere bidentate arsenate complex. Monodentate arsenate complexes have also been observed. Once arsenic anions have been "fixed" on active sites in the iron corrosion products, they are unlikely to desorb. Studies have found that only about 7-11% of adsorbed arsenic was released from exposed iron filings when flushed with 0.01 M NaNO3 in DI water. Additionally, as the arsenic complexes age, the rate of desorption decreases significantly, attaining 5.01-5.72% after 30 days and 2.88-4.29% after 60 days.

The more successful techniques that have been used in large municipal water supplies are not practical for smaller applications because of space requirements and the need to use dangerous chemicals. The two most common techniques for smaller water treatment systems have been reverse osmosis and activated alumina. The former method produces arsenic-containing waste streams that must be disposed of and the latter requires the use of caustic chemicals.

While many of these processes provide acceptable results only within narrow and restrictive parameters, most of these processes are costly and comparatively inefficient.

Further, none of the prior art methods meet the requirements of efficient removal of arsenic utilizing commonly and inexpensively available reagents with a minimum of mechanical processing and steps. Thus there is a need for an inexpensive and simple process that specifically removes arsenic from drinking water, such as municipal water systems and rural well systems.

BRIEF SUMMARY OF THE INVENTION

In this regard, the present invention provides a system for removing arsenic from water to safe levels at or below the EPA standards. The system is a hybrid spouted vessel/fixed bed filter system that significantly enhances/improves arsenic removal for drinking water using zero-valent iron (ZVI) particles. Movement of the circulating, iron-containing particles in a dense moving bed that forms on the spouted vessel bottom creates an abrasive "self-polishing" action among them that continuously generates colloidal iron corrosion products. This material then circulates with the water in the vessel and is removed and concentrated in a fixed bed filter. The colloidal material captured and immobilized in the filter has been shown to remove arsenic from contaminated water at very rapid rates (i.e., from 100 µg/L to <10 µg/L in less than an hour. This method of generation of colloidal corrosion products is capable of utilizing essentially all the ZVI material, which can be introduced hydro-dynamically into the spouted vessel as it is consumed, in a continuous or cyclic manner.

Operation of the hybrid system is simple. It requires essentially no attention other than periodic backwashing of the filter, which can be readily automated.

It is therefore an object of the present invention to provide an inexpensive and simple process that specifically removes arsenic from drinking water, such as municipal water systems and rural well systems. It is a further object of the present invention to provide a system that employs an inexpensive filter media within a low maintenance system that can quickly and effectively remove arsenic contamination from drinking water.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIG. 3 is a graph depicting arsenic removal of the present system as compared to prior art static systems; and FIG. 4 is a graph depicting arsenic removal of the present system with and without an additional filter added to the spouted vessel.

DETAILED DESCRIPTION OF THE INVENTION

Figure 1:
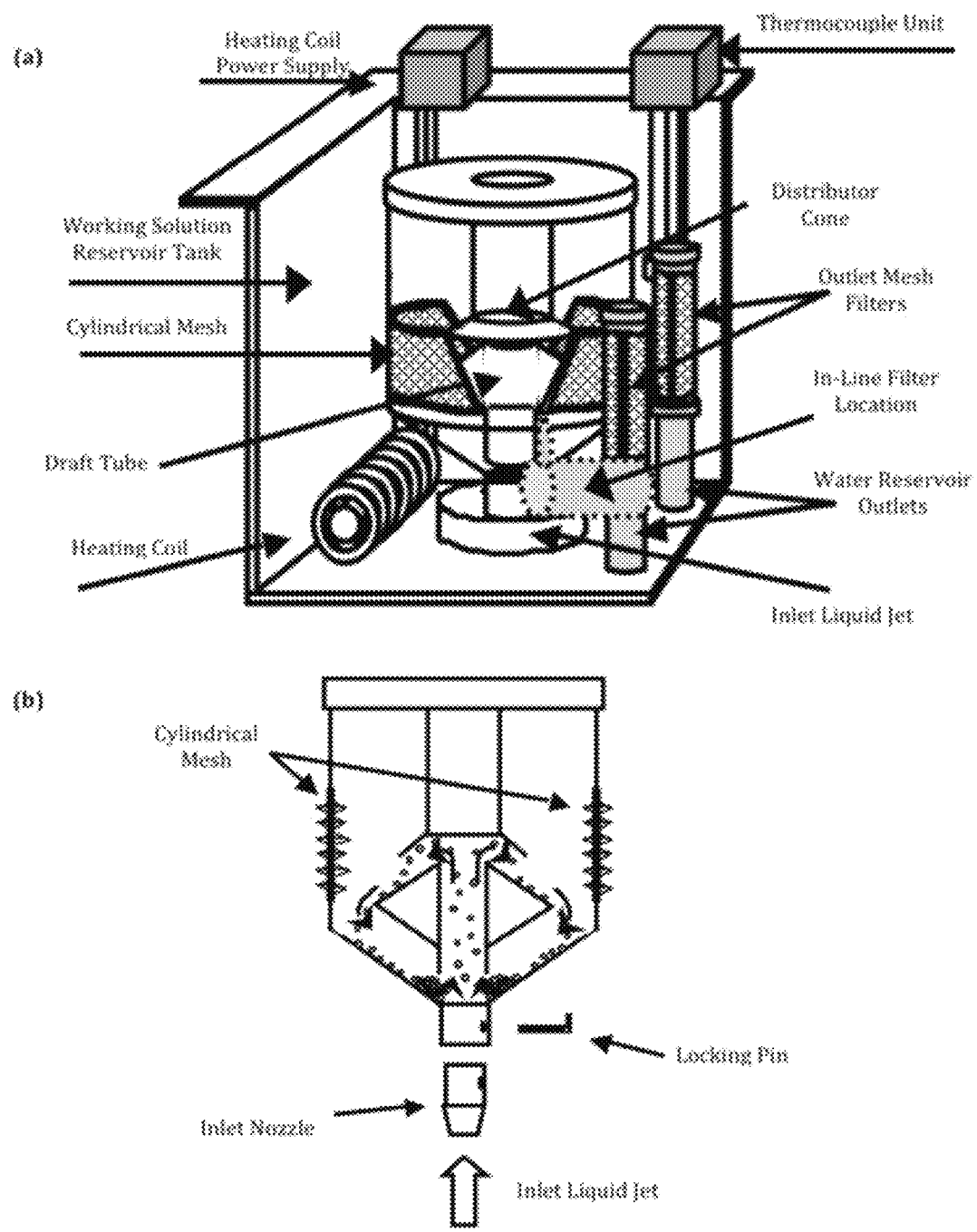
FIGS. 1a and 1b show a spouted vessel in accordance with the teaching of the present invention.

Now referring to the drawings, the present invention can be seen to provide a system for improved and efficient removal of aqueous arsenic species with zero-valent iron (ZVI). In the system arsenic ions are removed from solution via a mechanism involving adsorption, co-precipitation, and surface complexation with ZVI-generated Fe(II) and Fe(III) oxides, hydroxides, and oxyhydroxides. Generally the system employs of spouted vessels for the enhancement of arsenic removal using ZVI. Principally the system employs continuous abrasion or "self-polishing" action of circulating ZVI particles in the moving bed that forms on the conical spouted vessel bottom providing a continuous surface renewal mechanism for the generation of active colloidal iron corrosion products for arsenic complexation and surface renewal of the ZVI particles.

In one arrangement, batch samples of 50 to 300 mL of arsenic-containing working solution and carbon steel spheres. Other series of experiments were conducted in two separate continuous flow systems, a spouted vessel and a packed bed contactor that utilized the liquid recirculation loop of the spouted vessel system, operated in total recycle mode. As can be seen at FIGS. 1A and 1B a spouted vessel is presented. Its operation is similar to that of a spouted particulate electrode. Essentially, ZVI particles are entrained in the arsenic-containing liquid jet and convected upwards in the central draft tube. The entrained particles disengage from the liquid flow as the velocity decreases in the freeboard region, and then fall onto the inverted conical distributor. The collector/distributor cone channels the particles to the periphery, where they fall onto and become part of the particulate moving bed, which transports them inward and downward on the conical vessel bottom back to the entrainment region. The pumping action of the spout circulates the particles through the vessel in a toroidal fashion, upwards in the spout and downwards in the moving bed.

Figure 2:
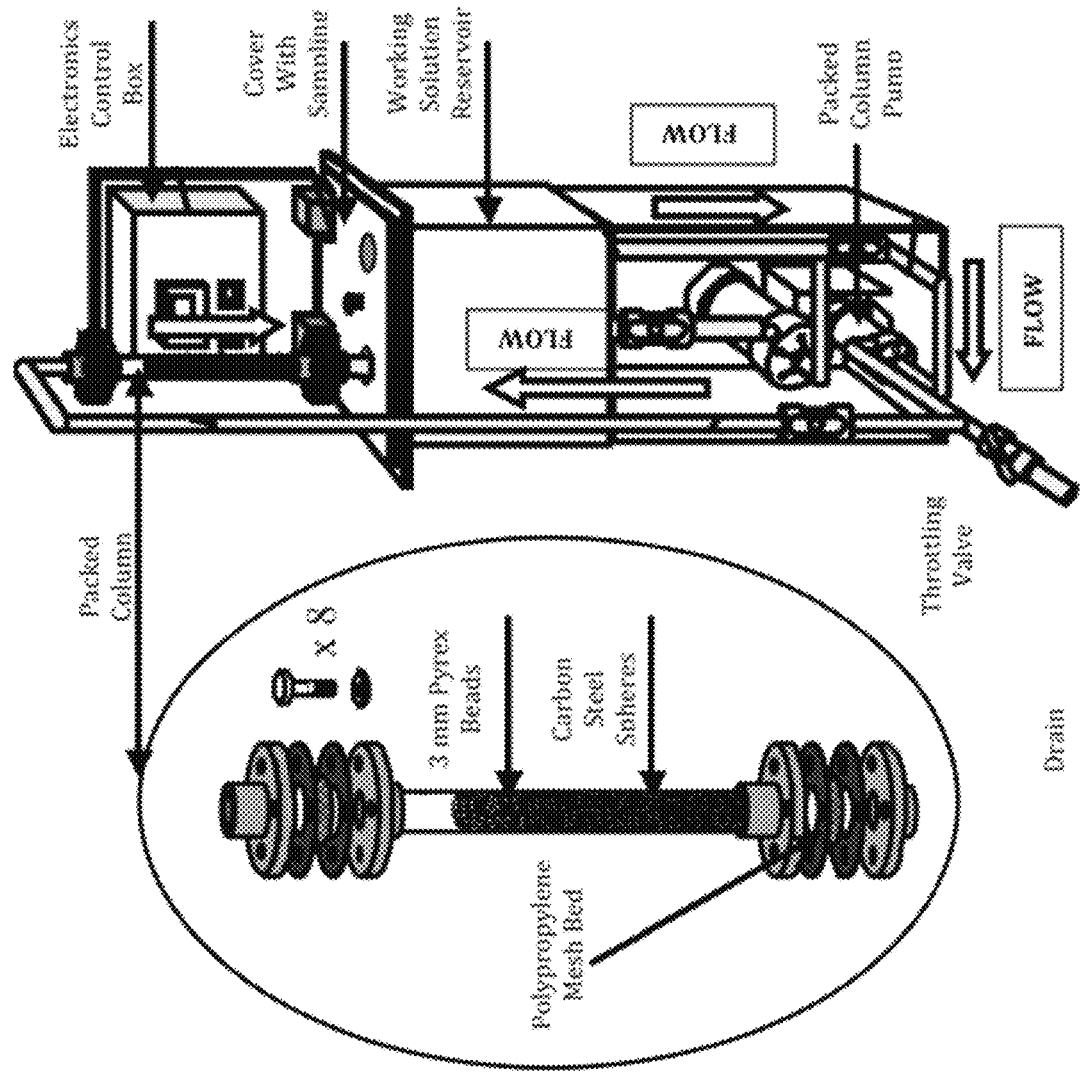
FIG. 2 is an enlarged view of a packed bed of the present invention in the form of a packed column.

As can be seen in FIGS. 2a and 2B, schematics of the packed column apparatus are presented. As shown, it was constructed to utilize the spouted vessel liquid recirculation system. For packed column operation, both the drain valve and the throttling valve of the spouted vessel system were kept open, the circulation pump for spouted operation was turned off, and the working solution was circulated through the packed bed flow loop with another pump. Carbon steel spheres such as but not limited to Grade 100, ⅛" diameter, carbon steel spheres (98.2-99.2 wt % iron) are as the iron source. Arsenic solutions were initially prepared as 1000 mg/L standard solutions of either As(III) or As(V). The As2O3 standard was prepared with sodium hydroxide, and then subsequently acidified with nitric acid. The resultant As(III) 30 mg/L stock solution was buffered at pH 4 with potassium hydrogen phthalate (KHP) and sodium hydroxide (1.492 g/L KHP, 8 mg/L NaOH). The As(V) 30 mg/L stock solution, including 1.5 g/L of NaCl, was prepared from the 1000 mg/L As(V) standard solution initially made up from 99.9% (arsenic basis) arsenic(V) pentoxide.

In both the spouted vessel and packed bed contactor experiments, 8 L of reagent water, followed by 8 L of the desired stock solution and then 8 L more of reagent water were added to the spouted vessel reservoir for a total of 24 L. The circulation pump was run to mix the solution, and the temperature controller was set to 45° C. Samples of the working solution were collected in order to determine the pH, and appropriate amounts of 1.0 M nitric acid or 1.0 M sodium hydroxide were titrated into the working solution to achieve the desired pH. This was only necessary for As(V) experiments, since the As(III) stock solution was buffered at pH 4. When the solution attained the desired operating temperature, 270.1 g of grade 100, ⅛" diameter, carbon steel spheres added to the spouted vessel. The same amount of particles was also used in the packed bed contactor.

In another embodiment, a cylindrical (5 in. long, 2.5 in. O.D.) 20 stainless steel, in-line filter was installed in the flow loop to remove and concentrate colloidal iron corrosion products from the bulk liquid solution. The filter was placed within the solution tank with its outlet connected to one of the two tank drain lines. The other drain line was fitted with a valve that was adjusted to equalize the pressure drop in the two outlet lines.

In order to simulate the behavior of immobilized ZVI particles in a fixed bed, 104 carbon steel spheres, were placed in a polypropylene mesh sample bag, which was then immersed in 300 mL of 99.8 µg/L arsenic solution at pH 4, prepared from an As(III) standard for a loading of 2.2 µg As/g Fe. The solution was stirred with a magnetic stir bar. The effects of particle-particle abrasion were simulated in batch experiments conducted in ten 50 ml centrifuge sample tubes attached to a mechanical rotator, each containing 40 mL of buffered 99.8 µg/L arsenic solution and 14 carbon steel spheres for the same initial loading of 2.2 µg As/g Fe. The samples were rotated at 60 rpm, maintaining the ZVI particles in constant motion, creating abrasion among themselves and with the walls of the centrifuge tubes. One tube at a time was then taken off the rotator at selected times. If no visible corrosion products were visible in the tube, a 1 mL sample of the solution was taken and preserved. For the tubes where corrosion products were visible, the contents were filtered through a 60 mL fine Büchner filter funnel (pore size of 4.0 to 5.5 µm). If corrosion product material remained in the filtrate, 50 mg of CaCl2 flocculent was dissolved in 10 mL of filtrate. After the corrosion material settled out, a 1 mL sample of the supernatant solution was collected.

The results of these experiments are presented in FIG. 3. As shown, the agitated particle experiments resulted in the removal of about 45% of the initial arsenic from solution (arsenic concentration of 55.6+4.0 µg/L) in 24 h, while the immobilized particle samples showed no signs of arsenic removal over the same time period. In addition, visual inspection of the sphere surfaces from the immobilized sample experiments showed no signs of reaction. Although regular sampling of the solutions in the immobilized samples was terminated after 24 h, solution/particle contact was allowed to continue for an additional 8 days. Corrosion of the spheres was finally visually observable at about 198.5 h, at which point the arsenic concentration had decreased to 36.1+4.0 µg/L. For the agitated samples, reddish-brown corrosion products were visible in the solution and on the steel particle surfaces after approximately 1 h, coincident with the observed decrease in arsenic concentration.

Although arsenic removal was observed for both the immobilized and agitated particle batch samples, the time scale was greater than that reported for other ZVI materials under similar experimental conditions. Further compared was arsenite removal at varying stirrer speeds with an initial concentration of 2.88 mg/L As(III) and an iron loading of 50 g of ZVI (28-35 mesh) in 2 L of 0.1 M NaClO4 solution. At 333 rpm a 99% As(III) removal was observed after 1 h. In comparison, 5 days were required to attain 96.5% As(III) removal at 5 rpm. In addition to enhanced mass transfer due to liquid shear, the continuous motion of the carbon steel spheres causes collisions between particles and with the centrifuge tube walls that continually removes corrosion products from the particle surfaces in a physical process that produces active high surface area colloidal material and exposes fresh ZVI material to continue/enhance the surface renewal/complexation process. These same mechanisms occur in the dense moving particle bed on the conical vessel bottom of the spouted vessel.

Comparisons of the performance of continuous flow experiments in the spouted vessel and packed column systems, in terms of the generation of iron corrosion products, also support the preceding conclusions. In one set of experiments, the steel spheres in the spouted vessel exhibited a mass loss that was an order of magnitude greater than that in the comparable fixed bed experiment; 24.3 g in the former, and 2.5 g in the latter. Visual inspection of the carbon steel spheres from the spouted vessel experiments showed the expected signs of corrosion. Those from the comparable packed column contactor experiments also exhibited corrosion products on the surfaces that were much thicker than those observed in the spouted vessel experiments. Indeed, in the packed column experiments, corrosion products filled much of the interstices between the spheres, "cementing" them together and providing much greater resistance to flow. Thus, the packed column contactor promoted the formation of corrosion products on the carbon steel sphere surfaces, whereas the spouted vessel promoted the formation of colloidal corrosion products in the bulk liquid phase.

In the current work, it was observed that exposed surfaces in the spouted vessel system were rapidly coated with colloidal corrosion products by operation with carbon steel spheres in the absence of arsenic. The carbon steel spheres and the solution were then removed, and the spouted vessel was filled with 24 L of fresh 100 µg/L As(V) solution. The arsenic concentration in solution was monitored over time by collecting and analyzing 1 mL samples of the bulk solution. After just 0.5 h of contact time with the pre-coated colloidal corrosion products, the arsenic concentration had decreased from 92.4 to 35.3 µg/L, and the presence of arsenic in solution was undetectable after 24.2 h. The contents of the spouted vessel were then drained, and the system was dried with ambient air without removing any of the pre-deposited colloidal corrosion products. Next, the spouted vessel was filled with 240 mL of a 1000 mg/L As(III) standard and filled with water to 24 L to yield an arsenic concentration of approximate 10 mg/L. The solution was then allowed to circulate for 20 days with samples taken periodically and analyzed by GFAAS. The results showed essentially no discernible arsenic removal by the colloidal corrosion products at this high arsenic concentration (10 mg/L). These results are interpreted to mean that colloidal corrosion products are quite effective in removing arsenic at low concentrations, but not at much higher concentrations. It is anticipated that under these conditions, all the available complexation sites on the pre-deposited colloidal corrosion material are rapidly saturated, and no additional arsenic can be removed without the generation of fresh colloidal corrosion material. Thus, the relative importance of suspended and deposited colloidal material vs. bulk surface iron corrosion products for the removal of arsenic from solution must be understood and carefully considered in order to understand performance differences between different arsenic removal systems for widely varying arsenic concentrations, and in the effective design of ZVI arsenic removal systems.

In another series of experiments, a filter was installed in the reservoir of the spouted vessel apparatus (see FIG. 1). The results of arsenic removal at low concentrations are presented in FIG. 4. As shown, the spouted vessel with internal filtering is a very effective technique for arsenic removal at low concentrations. The arsenic concentration of the solution attained a value of <2 µg/L in about an hour, which is significantly below the USEPA MCL of 10 µg/L. As shown in FIG. 4, the arsenic removal rate is much more rapid with the filter installed. Also, the resultant curve is not fit very well by a simple exponential, as would be the case for a first order process. These results indicate that about half of the total initial bulk arsenic will (eventually) be removed by the entrained, circulating colloidal material in the bulk liquid solution, and the other half by complexation with active colloidal material adsorbed onto the surfaces of the spouted vessel apparatus.

As shown, the performance of the hybrid spouted vessel/fixed bed filter system for arsenic removal is quite effective. With the filter in place, there is no appreciable arsenic complexation in the bulk liquid phase since there is little or no colloidal material available in that phase. For the same reason, as well as its more limited capacity, the adsorbed surface layer is also an ineffective sink for arsenic under these conditions. Therefore, arsenic removal occurs almost completely within the filter. In the absence of the filter, active colloidal material is available in the bulk liquid phase for arsenic removal, and for rapid formation of the adsorbed surface layer.

It is of note that both of these sinks are comparable in terms of the total amount of arsenic removal over the long run. It is also apparent, however, that the adsorbed colloidal material complexes arsenic at a much greater rate than that in the bulk liquid phase, primarily due to the much lower effective active site concentration in the latter sink. However, the adsorbed material is also rapidly saturated due to its more limited capacity. In other words, with the filter, the rate of arsenic removal is high due to the very high concentration of active sites within the filter, so that the kinetic process is arsenic concentration-limited. Without the filter, the effective mean concentration of active sites is low such that the overall kinetic process becomes active site concentration-limited. Of course, this behavior is dependent on the arsenic concentration range under consideration and the intrinsic activity of the colloidal material formed.

It can be seen that the hybrid spouted vessel/fixed bed filter system is demonstrated to be particularly efficacious for the removal of arsenic from aqueous solutions at low concentrations (e.g., to meet drinking water standards). As shown, the effective treatment time can be reduced by an order of magnitude or two, with a proportionate increase in the effective water treatment rate. The novel hybrid nature of the system lies in its dual-function character, whereby colloidal material is continuously generated in the moving bed on the spouted vessel bottom, and arsenic removal/complexation occurs in the fixed bed filter. This method of generation of colloidal material maximizes utilization of essentially all the ZVI material, in comparison to fixed systems where the effectiveness is reduced by the development of a diffusion barrier of corrosion products, such that only a relatively small fraction of the iron is ever actually utilized to remove arsenic.

Operation of the hybrid system is particularly simple and cost effective. It requires essentially no attention other than periodic backwashing of the filter to remove the collected colloidal material, which can be readily automated. With the current system, under the operating conditions used, the filter begins to plug after about 28 h on stream. This cycle time is sufficient to remove essentially all the arsenic at an initial concentration of 100 µg/L to less than detectable limits from about 800 L, or about 7.8 gal/h, utilizing only about 7.5% of the initial charge of ZVI material in a relatively small device. It can also be readily scaled-up. Moreover, it is expected that potentially significant improvements in performance beyond those reported here can be achieved via system optimization, including: the use of more optimal filter types/capacities; more optimal geometry/operating conditions of the spouted vessel; pH control to maximize corrosion product formation; etc. The mechanistic analysis of arsenic behavior in the system demonstrates that the apparent kinetic behavior of arsenic in systems where colloidal (i.e., micro/nano) iron corrosion products are dominant can be complex and may not be explained by simple first or zeroth order kinetics. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A system for the removal of arsenic from water, comprising
    a vessel having a spouted vessel bottom and containing zero valent iron particles having corrosion products on their surfaces; water containing arsenic disposed within said vessel; and
    a fluid circulation system comprising an external inlet nozzle connected to the spouted vessel bottom, an inlet liquid jet in fluid communication with the external inlet nozzle and a draft tube disposed above an inlet spout;
    wherein water containing arsenic from the inlet liquid jet enters the external inlet nozzle and circulates said zero valent iron particles upwardly along said draft tube to redeposit them into the vessel wherein the spouted vessel bottom channels the zero valent iron particles towards the inlet spout causing zero valent iron particle-zero valent iron particle abrasion and removal of the corrosion products from the the surfaces of the zero valent iron particles, wherein the zero valent iron particles are carbon steel spheres, and wherein the corrosion products bind with arsenic within the water.

2. The system of claim 1, wherein the zero valent iron particles circulate in a moving bed formed on the spouted vessel bottom.

3. The system of claim 2, further comprising: a filter within said vessel, said filter removing arsenic bound to the corrosion products from the water containing arsenic as it is circulated within said vessel.

4. The system of claim 1, wherein said zero valent iron particles are carbon steel spheres having a diameter of about 1/8".

5. The system of claim 1, further comprising: a filter within said vessel, said filter removing arsenic bound to the corrosion products from the water containing arsenic as it is circulated within said vessel.

6. The system of claim 5, wherein the filter is a fixed bed filter.

7. A method for the removal of arsenic from water, comprising
    circulating water including arsenic through a vessel having a spouted vessel bottom and a fluid circulation system comprising an external inlet nozzle connected to the spouted vessel bottom, an inlet liquid jet in fluid communication with the external inlet nozzle and a draft tube disposed above an inlet spout, and containing zero valent iron particles having corrosion products on their surfaces, wherein the water including arsenic from the inlet liquid jet enters an external inlet nozzle and circulates said zero valent iron particles upwardly along said draft tube to redeposit them into the vessel, wherein the spouted vessel bottom channels the zero valent iron particles towards the inlet spout, and wherein circulation causes zero valent iron particle-zero valent iron particle abrasion and removal of the corrosion products from the surfaces of the zero valent iron particles to create colloidal iron corrosion products and wherein the zero valent iron particles are carbon steel spheres;
    binding the arsenic to the colloidal iron corrosion products; and
    removing the arsenic bound to the colloidal iron corrosion products from the water.

8. The method of claim 7, wherein the zero valent iron particles circulate in a moving bed formed on the spouted vessel bottom.

9. The method of claim 8, wherein the moving bed containing zero valent iron particles is in fluid communication with said vessel; wherein the vessel includes a filter, said filter removing colloidal arsenic from the water.

10. The method of claim 7, wherein said zero valent iron particles are carbon steel spheres having a diameter of about 1/8".

11. The method of claim 7, further comprising a filter within said vessel, said filter removing arsenic bound to the colloidal iron corrosion products from said water as it is circulated within said vessel.

12. The method of claim 11, wherein the filter is a fixed bed filter.

13. The method of claim 11, further comprising periodic backwashing of the filter to remove collected colloidal material, wherein the collected colloidal material comprises the arsenic bound to the colloidal iron corrosion products.

* * * * *